Patented Jan. 26, 1954

2,667,421

UNITED STATES PATENT OFFICE 2,667,421

PACKAGING COMMODITIES

Willis J. Parks, Richmond, Calif., assignor to Owens-Illinois Glass Company, a corporation of Ohio No Drawing. Application January 30, 1951, Serial No. 208,674

10 Claims. (Cl. 99—171)

This invention relates to the packaging of commodities of the type which are subject to spoilage due to growth of yeast, mold, or other organisms. The invention is of particular value in the packaging of comestibles and especially dried fruit or other commodities having a similar moisture content.

A serious problem arises in the packaging of certain commodities due to the fact that the growth of yeast and mold organisms is nurtured by the moisture in or on the commodity, or in the surrounding atmosphere. This condition is especially noticeable in the case of dried fruit. Although the moisture content in the case of dried fruit may be lowered to diminish this action, a certain amount of moisture must be present in the dried fruit in order to maintain the desired appearance and edible characteristics.

It is current practice to package such commodities in containers which are sealed in order to prevent the infiltration of air. In the case of dried fruit, cartons or plastic bags are often used.

Such a method of packaging is not satisfactory since the air remaining in the package not only contains moisture which will nuture the growth of the organisms but the oxygen in the air will discolor the product after a short period of time. In addition, the type of package used in the case of dried fruit is subject to being easily mutilated in shipment and handling, thereby destroying the effectiveness of the sealed package. Insects and rodents also may easily infest the package due to the inherent properties of the carton or plastic bag materials.

As a result, the packages which are currently in use for dried fruit must be handled as if they were semi-perishable and must often be refrigerated in order to inhibit or delay the spoilage.

It is therefore an object of this invention to provide a method of packaging commodities which results in an effective package wherein spoilage due to yeast and mold organisms will be inhibited for an extended period of time.

It is a further object of this invention to provide a method of packaging commodities which results in a package which is also capable of withstanding normal abuse and treatment in shipping and handling.

Other objects of the invention will appear hereinafter.

Basically, the invention provides for placing the product in a suitable container; adding a highly volatile fumigating agent to inhibit the growth of the organisms; subjecting the contents of the container to a high vacuum in order to remove the air and volatilize the fumigating agent; and sealing the container while subjecting it to the vacuum.

The container must be of a type which can be hermetically sealed and which will retain the high vacuum. Containers made of glass have been found to be very satisfactory.

The chemical fumigating agents must be of such a type and must be used in such amounts as to be effective in inhibiting the growth of yeast, mold and other organisms. It is also desirable that the agent have a low boiling point, thereby being highly volatile, in order that it will easily volatilize when subjected to sub-atmospheric pressure and more easily permeate the contents of the container. It is also desirable that the fumigating agent be heavier than air in order to aid in the displacement of the air in the container. Agents of the class of epoxides have been found to be very satisfactory. Of these, propylene oxide and ethylene oxide are probably the most suitable. Propylene oxide is preferred since it is a liquid at normal room temperatures and is therefore easier to handle.

It is desirable that the contents of the container be subjected to the maximum degree of vacuum which can be applied without mechanically damaging the product. The drawing of a vacuum performs the important function of withdrawing the air from the contents of the container and thereby decreasing any tendency of the air to nuture the growth of the organisms and also the function of decreasing any tendency of the oxygen in the air to discolor the product.

In addition, when the contents of the container is subjected to a vacuum and the pressure is thereby reduced to sub-atmospheric, the fumigating agent is volatilized. The agent in volatile form can more easily permeate and contact the surfaces of the commodity in the container than if it were in liquid form. Moreover, only a small amount of liquid is needed to produce the required volume of gas.

Since the volatile fumigating agent is heavier than air, it will also aid in the displacement of the air by penetrating into the lower portion of the container.

After sealing, another beneficial result is obtained. The volatilized fumigating agent will gradually combine with the moisture in the dried fruit and hydrolyze, becoming a colorless and tasteless liquid. This hydrolyzing of the epoxides to glycols usually takes place within a period of 7 to 30 days. This change from a gaseous to a liquid substance involving a great diminution in volume necessarily increases the degree of vacuum in the container and thereby produces a much more effective package.

This method has been found to be especially beneficial in the packaging of dried fruit or other commodities having a similar moisture content, varying between 15 and 35 per cent. For example, in the packaging of dates, having a moisture content between 18 and 30 per cent, the dates at room temperature (60–100° F.) are placed in a container and the propylene oxide in liquid form is introduced into the container. The dosage of propylene oxide may be varied, but a dosage of such an amount that one cc. per pound of fruit remains after vacuumizing and sealing has been found to give very satisfactory results.

The container and its contents are then placed in a suitable vacuumizing apparatus and subjected to a vacuum and the container is sealed while being subjected to this vacuum. It is desirable that the degree of vacuum be as high as possible without mechanically damaging the product. If too high a vacuum is applied, the syrup will be drawn from the interior of the dried fruit and thereby destroy the appearance and edible characteristics of the product. In the case of dates, a vacuum of 18 to 20 inches of mercury has been found to give very satisfactory results. After being stored for a period of 7 to 30 days, during which the propylene has completely hydrolyzed, the sealed containers have been found to have a vacuum as high as 25 inches of mercury.

The vacuum products an additional beneficial result in the case of dried fruit since it expands and opens the crevices or pockets on the interior of the dried fruit. This gives free access of the fumigating agent permitting it to contact and kill the organisms which usually heavily contaminate these crevices or pockets.

It can be seen that this method results in a package wherein the spoilage due to yeast and mold organisms is inhibited for a prolonged period of time. In addition, the method results in an individual package which will withstand the normal abuse and treatment in shipping and handling and requires no special care or storage in order to prevent spoilage.

Modifications may be resorted to within the spirit and scope of the appended claims.

I claim:

1. A package comprising an impervious container with dried fruit placed therein, and a cap hermetically sealed to the container, said sealed container containing propylene oxide at subatmospheric pressure.

2. A package comprising an impervious container with dried fruit therein, and a cap hermetically sealed to the container, said sealed container containing a highly volatile fumigating agent selected from the class of epoxides at subatmospheric pressure.

3. The method of fumigating and preserving a comestible containing moisture which comprises enveloping the same in a vapor of propylene oxide, sealing the comestible within an impervious container while enveloped in said vapor, and thus reacting the propylene oxide with moisture within the sealed container to form propylene glycol.

4. The method defined in claim 3, the container being non-collapsible under the pressure differential produced by the said reaction, whereby a partial vacuum is produced and maintained within the sealed container.

5. The method of packaging comestibles having a moisture content, which comprises introducing such product into a container capable of withstanding atmospheric pressure without collapse when vacuumized to a high degree, introducing into the container in liquid form a fumigant selected from the class of epoxides which has a low boiling point and is highly volatile and produces a gas substantially heavier than air, vacuumizing the container and thereby volatilizing the fumigant and causing it to displace the air in the container, then hermetically sealing the container and causing the fumigant to hydrolyze and form glycols with the moisture content of the comestibles within the container so that the fumigant no longer exists as such and the degree of vacuum is increased and maintained as long as the container remains hermetically sealed.

6. The method of packaging and preserving dates containing moisture which comprises introducing the dates into a container, introducing a measured amount of a fumigant consisting of propylene oxide in liquid form into the open container, then drawing a sufficiently high vacuum within the container to volatilize the propylene oxide and to expand the dates so that any cracks and crevices in the surface portions thereof are expanded and open to the action of the gaseous fumigant, thereby causing the destruction of mold and yeast spores and any bacteria present on the dates, the fumigant also operating to displace the air content from the container, and then sealing the container and thus causing the gaseous fumigant to gradually hydrolyze with the moisture in the dates and thereby increasing the degree of vacuum within the sealed container.

7. The method of packaging and preserving a commodity of the type subject to spoilage due to growth of yeast, mold, or other organisms, which method comprises the steps of placing said commodity in a container made of a material which will retain a vacuum, adding propylene oxide in liquid form, subjecting said container and its contents to a vacuum and thereby removing the air from the container and volatilizing the propylene oxide, and hermetically sealing said container while subjecting it to the vacuum.

8. The method of packaging dried fruit having a moisture content of between 15 and 35% which comprises introducing the dried fruit into a container capable of withstanding atmospheric pressure without collapsing when vacuumized to a high degree, introducing into the container in liquid form a fumigant selected from the class of epoxides which has a low boiling point and is highly volatile and produces a gas substantially heavier than air, vacuumizing the container and thereby volatilizing the fumigant and causing it to displace the air in the container, then hermetically sealing the container and maintaining it sealed while the volatilized fumigant is retained therein and thereby causing the fumigant to hydrolyze and form glycols with the moisture content of the dried fruit within the container so that the fumigant no longer exists as such and the degree of vacuum is increased and maintained as long as the container remains hermetically sealed.

9. The method of packaging dates having a moisture content between 18 and 30% which comprises introducing the dates into a container capable of withstanding atmospheric pressure without collapse when vacuumized to a high degree, introducing into the container in liquid form a fumigant selected from the class of epoxides which has a low boiling point and is highly volatile and produces a gas substantially heavier than air, said dates, container and fumigating agent being at a temperature less than 100° F., vacuumizing the container and thereby volatilizing the fumigant and causing it to displace the air in the container, then hermetically sealing the container at a vacuum of 18 to 20 in. Hg and maintaining it sealed while the volatilized fumigant is retained therein and thereby causing the fumigant to hydrolyze and form glycols with the moisture content of the dates within the container so that the fumigant no longer exists as such and the degree of vacuum is increased and maintained as long as the container remains hermetically sealed.

10. The method of packaging and preserving a commodity of the type subject to spoilage due to growth of yeast, mold, or other organisms, which method comprises the steps of placing the said commodity in a container made of a material which will retain a vacuum, adding a highly volatile fumigating agent in liquid form, said agent being selected from the class of epoxides and being capable of inhibiting the growth of yeast, mold, or other organisms, subjecting said container and its contents to a vacuum and thereby removing the air from the container and volatilizing the fumigating agent in the vacuum thus produced, and hermetically sealing said container while subjecting it to the vacuum.

WILLIS J. PARKS.

References Cited in the file of this patent

UNITED STATES PATENTS

| Number | Name | Date |
| --- | --- | --- |
| 2,080,179 | Merriam et al. | May 11, 1937 |
| 2,189,947 | Griffith et al. | Feb. 13, 1940 |
| 2,511,987 | Mark | June 20, 1950 |